UNITED STATES PATENT OFFICE.

ADOLPH SOMMER, OF BERKELEY, CALIFORNIA.

PAINT-OIL.

SPECIFICATION forming part of Letters Patent No. 396,774, dated January 29, 1889.

Application filed December 31, 1887. Serial No. 259,487. (No specimens.)

*To all whom it may concern:*

Be it known that I, ADOLPH SOMMER, a citizen of the United States, and a resident of Berkeley, in the county of Alameda and State of California, have invented a new and useful Composition for Paint-Oil; and I do hereby declare that the following is an exact description of the invention, which will enable other chemists to make the same compound.

Oils which have been derived from marine animals, whether from mammals or fishes, are acted upon by chloride of sulphur ($S_2Cl_2$) in very much the same manner as most other fatty oils. Mixed with a small proportion of chloride of sulphur, they are converted into more or less thick viscid liquids, while a large proportion of chloride converts them into semi-solid or solid substances. Besides this effect, chloride of sulphur produces still another change in these oils, which has not been observed heretofore, and which is analogous to the change effected upon linseed-oil by the operation of boiling or blowing.

Oils from marine animals, and particularly those from certain fishes, possess, as is well known, to a certain extent the property of drying or hardening on exposure to the air. They are on this account frequently used as adulterants and substitutes for linseed-oil, to which oil they are, however, greatly inferior on account of their drying but very slowly. This property of drying is, I find, much increased in these oils by the addition of chloride of sulphur, and I also find that this increase stands, up to a certain limit, in direct proportion to the quantity of chloride of sulphur added. If enough chloride of sulphur— that is, from sixteen to twenty-six parts of chloride to one hundred parts of oil—is added, some of these oils, and especially the common fish-oils, dry almost as rapidly as unadulterated boiled linseed-oil; but when used in such proportions chloride of sulphur converts these oils, as it does a great many other fatty oils, into semi-solid or solid masses, although the quantity of chloride which is necessary to solidify the various oils differs widely, being, for instance, sixteen per cent. for whale-oil, twenty-two per cent. for fish-oil, and twenty-six per cent. for sperm-oil, (provided the sperm-oil is kept neutral during the reaction; otherwise it is not solidified at all.) Oils thus solidified were heretofore supposed to be entirely insoluble in the usual solvents for the natural oils; but I find that this rule, while it holds good for a great many animal as well as vegetable oils, does not apply to those derived from marine animals. These latter, if in their preparation the proportion of chloride of sulphur has been kept within certain limits, are still fairly soluble in many of the solvents for the original oils. The limit in the proportion of chloride of sulphur beyond which these oils, too, become practically insoluble has a very wide range, varying even for the same oil with the process and the solvent employed. When hydrocarbons of the paraffine series are employed as solvents and are mixed with an equal amount of the oil previous to the addition of the chloride of sulphur, the proportion of the chloride, which should not be exceeded is, for every one hundred parts of oil, for instance: with seal-oil, 17.5 parts; with whale-oil, about nineteen parts; with herring-oil, about twenty parts; with cod-liver oil, about twenty-five parts; with salmon-oil and ordinary fish-oils, about twenty-six parts.

For a mixture of oils the limit is not always the mean of the limits of the component parts, but is frequently modified by the presence of an oil for which the chloride of sulphur has a greater affinity, and with which it therefore combines in preference to the other oils. On account of this uncertainty it becomes necessary, whenever it is desired to combine the largest possible proportion of chloride of sulphur with an oil of doubtful purity, to determine the limit by a few experiments on a small scale. The limit for any particular oil or mixture of oils having been ascertained, care must always be taken to keep the proportion of chloride of sulphur below this point when the product is to serve the purpose specified. The number of solvents which may be employed for diluting these thickened or solidified oils is very great; but for economic and sanitary reasons only those hydrocarbons come into consideration which are commonly employed for thinning paints— namely, the terpines and the moderately-volatile tar and petroleum oils. The volatile petroleum-oils and tar-oils, especially benzine, coal-oil, and photogen, I use mostly, because they are generally cheaper and more abundant than other solvents. For preparing these paint-oils several methods are available, the choice of which depends as much upon local conditions as upon the chemical nature of the component parts employed. When, for instance, the composition is wanted in a locality where the price of the solvent is very low, while that of the oil is much higher than in some other locality, it may be advantageous to make the compound of chloride of sulphur and oil at that place where the oil is the cheapest, then to ship this compound and dilute it in the locality where the price of the solvent is the lowest. The following process I find best suited to this contingency:

The oil is mixed with from 1.5 to four per cent. of a neutralizing agent, which may be either finely-powdered calcium hydroxide, magnesium oxide, or magnesium carbonate, and to it is then added the chloride of sulphur, in the manner described in an application bearing the serial number 227,575 and filed February 14, 1887. The resulting compound is mixed at any convenient time or place with from three-fourths to one and a half time its weight of the hydrocarbon which is to serve as diluent, and, if necessary, digested therewith until the mixture forms a uniform oily liquid; but, unless some special reason makes the adoption of this method or of some modification of it indispensable, I generally operate in the following manner:

I mix the oil with from three-fourths to one and a half time its weight of the hydrocarbon, which in this case must not be an olefine nor a terpine, they being acted upon by chloride of sulphur, but should preferably belong to the paraffine series of hydrocarbons. To this mixture I add any one of the neutralizing agents previously mentioned, and lastly incorporate with it the chloride of sulphur. Cooling the ingredients when operating in this manner is not absolutely necessary, because, owing to the dilution with the hydrocarbon, the reaction is very much moderated. The composition thus produced is allowed to stand quietly for several days to deposit particles held in suspension, after which it is ready for use. But certain oils of this class—as, for instance, cod-liver oil—do not permit of the addition of the neutralizing agents previously mentioned, they being rendered insoluble thereby. These therefore have to be treated with chloride of sulphur in the absence of such neutralizing agents, and may be, like the other oils, subjected to this treatment either in their natural state or diluted with a hydrocarbon. The compounds thus produced in the absence of a neutralizing agent contain always more or less acid, principally hydrogen chloride, and, although they may be employed in this form for the purpose specified, I consider it best to free them from the adhering acid. The removal of the acid may be accomplished in a mechanical way, or by chemically combining it with bases or with certain unsaturated compounds.

A means of removing the acid mechanically consists in agitating the acid mixture in the open air, or in passing a current of air through the same until the desired result is accomplished; but this is an extremely tedious process, requiring a very long time, and it also has the disadvantage of causing the oil, through oxidation and evaporation of the solvent, to become thicker. A more rapid method of removing the acid is afforded by a combination of the mechanical and chemical processes, and consists in passing through the acid mixture air which has been charged with the vapor of ammonia, trimethylamine, or other nitrogenous bases. These vapors, on account of their alkaline character, act in the same manner as the inorganic neutralizing agents described and claimed in a previous application bearing the serial number 209,637 and filed July 31, 1886.

Instead of air, other gases may be employed, especially those obtained by the destructive distillation of coal, wood, resins, fats, or animal matter. These gases, owing to their containing some of the higher olefines—such as propylene, butylene, as well as other unsaturated compounds the use of which is claimed in an application bearing the serial number 284,173 and filed August 30, 1888—are capable of neutralizing the acid oils in a comparatively short time, even without the addition of volatile nitrogenous bases. The most rapid way of neutralizing these acid mixtures consists, however, in adding to them solid or liquid neutralizing agents. For this purpose may be employed either inorganic substances of the nature described in the application first alluded to, nitrogenous organic bases which constitute the organic equivalents of the former class, or unsaturated hydrocarbons enumerated in the second of the above-mentioned applications. Of the inorganic neutralizing agents I generally prefer for these oils the dekahydrated carbonate of sodium, of which I add from two to three per cent. of the weight of the oil either in the form of a concentrated aqueous solution or in the shape of a granulated salt. Of the nitrogenous organic bases, which are too numerous for complete enumeration in this description, I will only mention as typical representatives the amines, such as aniline, pyridine, quinoline, and their homologues. These compounds I employ, for economic reasons, scarcely ever in the pure state, but use them generally in the crude condition in the form of bone-oil or some other pyrodistillate which contains such compounds dissolved in some neutral substance. Of the unsaturated hydrocarbons I use any one or a mixture of the olefines or terpines described in the second of the above-mentioned applications.

Whenever any of the above-described liquids consisting wholly or in part of some suitable unsaturated compound can be obtained cheaply and conveniently, I employ them as neutralizing agents in preference to any other agent or method, and when they are not otherwise objectionable I even use them as the sole diluent or solvent of the thickened or solidified fatty oils.

I am aware that mention is made in the chemical literature of a solution of the compound formed from linseed-oil and chloride of sulphur in bisulphide of carbon, which solution is prepared by adding twenty-five parts of chloride of sulphur to a mixture of one hundred parts of linseed-oil and three thousand parts of bisulphide of carbon, and that this solution has been recommended as a varnish. However, this combination does not anticipate my invention, because, first, I do not employ bisulphide of carbon as a solvent, this substance being poisonous when breathed, and also being unfit for painting purposes on account of its too rapid evaporation, but I use solvents which are comparatively harmless and evaporate rather slowly; secondly, I do not use linseed-oil in making my compositions, there being nothing gained in thus treating linseed-oil in place of the usual boiling or blowing, but I use oils which are less costly in order to form substitutes for the more expensive linseed-oil; thirdly, linseed-oil does not form a solution when any of the hydrocarbons which have been enumerated above are substituted for the bisulphide of carbon in the composition previously mentioned, while the oils from the marine animals do form solutions with these hydrocarbons when treated in the manner described; fourthly, the keeping quality of the solution of sulpho-chlorinated linseed-oil in bisulphide of carbon is bad, it becoming turbid upon standing for some weeks and depositing a voluminous flocculent sediment, while the solutions of the described marine-animal oils in hydrocarbons remain unaltered for an indefinite length of time.

I am also aware that Alexander Parkes claims to have formed solid elastic articles by mixing one hundred parts of either linseed-oil, cotton-seed oil, or castor-oil with ten to fifteen parts of chloride of sulphur and twenty to thirty parts of either bisulphide of carbon, benzole, or mineral naphtha, and then pouring this mixture upon a plate of glass or into a mold, where, as he says, the mixture would set or harden. Instead of being poured upon a glass plate, the mixture may also, he says, be spread upon cloth or worked up with fibrous or other material. Yet these mixtures do not anticipate my invention, because, first, they are made from either linseed, cotton-seed, or castor oil, all of which are obtained from plant-seeds, while I employ the oils from marine animals; secondly, the proportion of chloride of sulphur employed in these mixtures is only from ten to fifteen per cent. of the weight of the oil, while I employ from sixteen to twenty-six per cent.; thirdly, the purpose and function of those extremely volatile diluents—namely, bisulphide of carbon, mineral naphtha, benzole—in so small quantities as twenty to thirty per cent. of the weight of the oil is not to dilute or dissolve an otherwise semi-solid or solid compound, but merely to reduce the temperature through their evaporation during the reaction between the oil and the chloride of sulphur, while the purpose and function of my but moderately volatile diluents—namely, turpentine, benzine, coal-oil, photogen—in so large proportions as seventy-five to one hundred and fifty per cent. of the weight of the oil is to dilute or dissolve compounds which would otherwise form semi-solid or solid masses; fourthly, the aim of Parkes was to form mixtures which, when poured, before the ingredients had completely combined, upon glass or into a mold, or spread in this condition upon cloth, or worked up with fibrous or other material, would set or harden and form variously-shaped solid elastic articles, while I use every means to prevent a spontaneous gelatinization or hardening, my object being to form liquid compounds which shall have as nearly as possible the consistency and properties of boiled linseed-oil.

Having thus described my invention, what I claim as new, and desire to secure by Letters Patent, is—

As a new composition, the solution in hydrocarbons of the sulpho-chlorinated marine-animal oils.

ADOLPH SOMMER.

Witnesses:
EDMOND O'NEILL,
JAMES P. DUNN.